March 31, 1953 R. A. WHITLOCK, JR 2,633,325
LIFT-TURN VALVE HANDLE STRUCTURE
Filed May 23, 1945 3 Sheets-Sheet 1

INVENTOR.
Robert A. Whitlock, Jr.
BY
McCanna and Morsbach

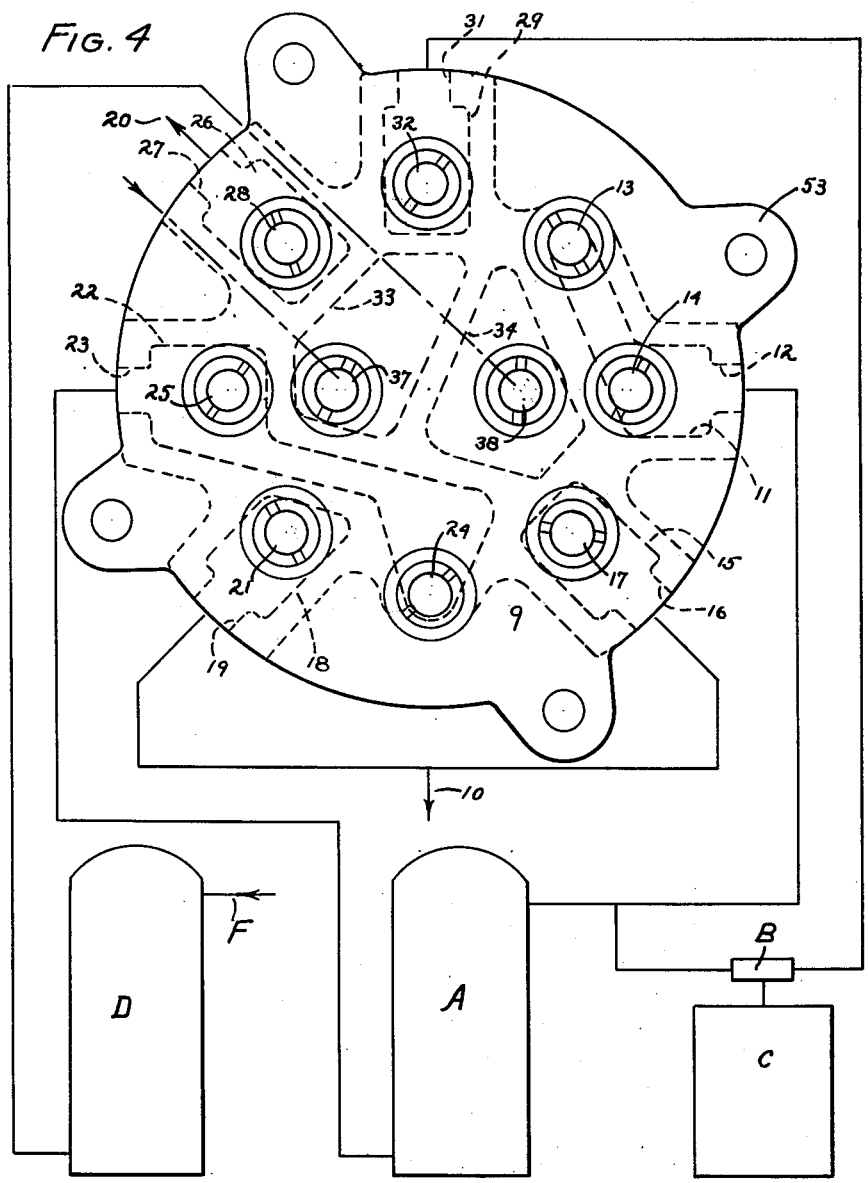

March 31, 1953     R. A. WHITLOCK, JR     2,633,325
LIFT-TURN VALVE HANDLE STRUCTURE
Filed May 23, 1945     3 Sheets-Sheet 3
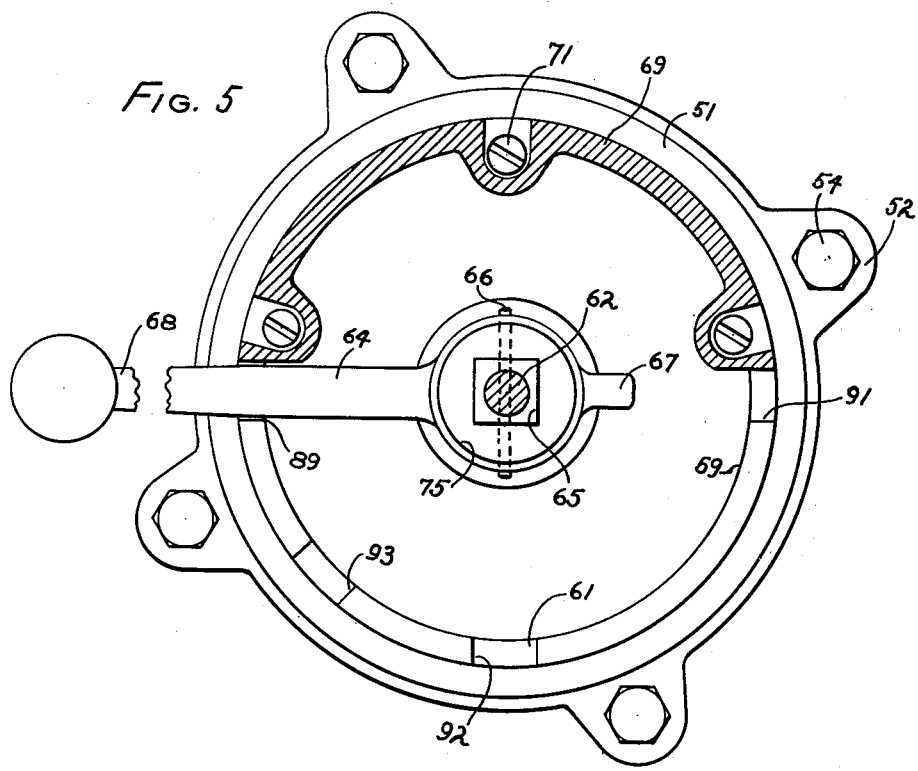
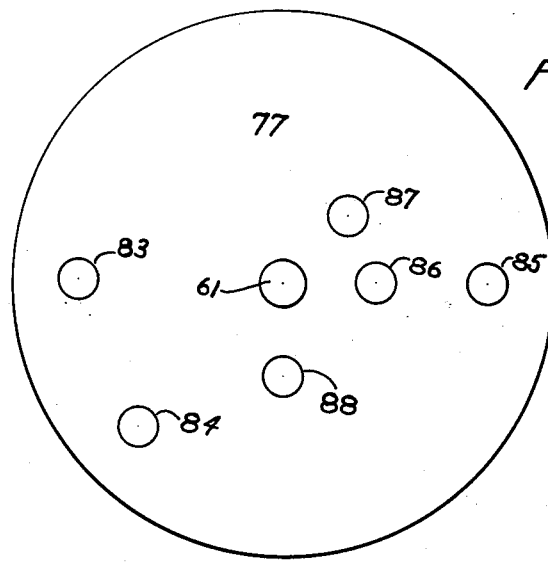
INVENTOR.
Robert A. Whitlock, Jr.
BY
McCanna and Morsbach Patented Mar. 31, 1953

2,633,325

UNITED STATES PATENT OFFICE 2,633,325

LIFT-TURN VALVE HANDLE STRUCTURE

Robert A. Whitlock, Jr., Rockford, Ill., assignor to Automatic Pump & Softener Corporation, Rockford, Ill., a corporation of Illinois Application May 23, 1945, Serial No. 595,417

4 Claims. (Cl. 251—90)

This invention relates to valves and has special reference to a multiple port valve of the lift-turn type of novel construction.

An important object of the invention is the provision of a valve of the type described having improved structure for retaining the valve in its seated position and for moving the valve thereto including improved means for guiding and supporting the rotor during its movement.

A further object of the invention is the provision of a valve of the type described having novel gasket means disposed on the face of the stationary member for sealing the ports.

Another important object of the invention is the provision of a valve of the type described having a novel port structure in the movable and stationary parts of the valve to provide novel flow characteristics therein.

Other objects and advantages will appear from the following description and the accompanying drawing, in which—

Fig. 4 is a face view of the back plate showing the chambers and pipe connections in dotted lines and showing diagrammatically the manner in which the valve is connected in a fluid treatment system;

Fig. 5 is a section on the line 5—5 of Figure 1, and

Fig. 6 is a bottom view of the rotor in the position shown in Figure 1.

Figure 1:
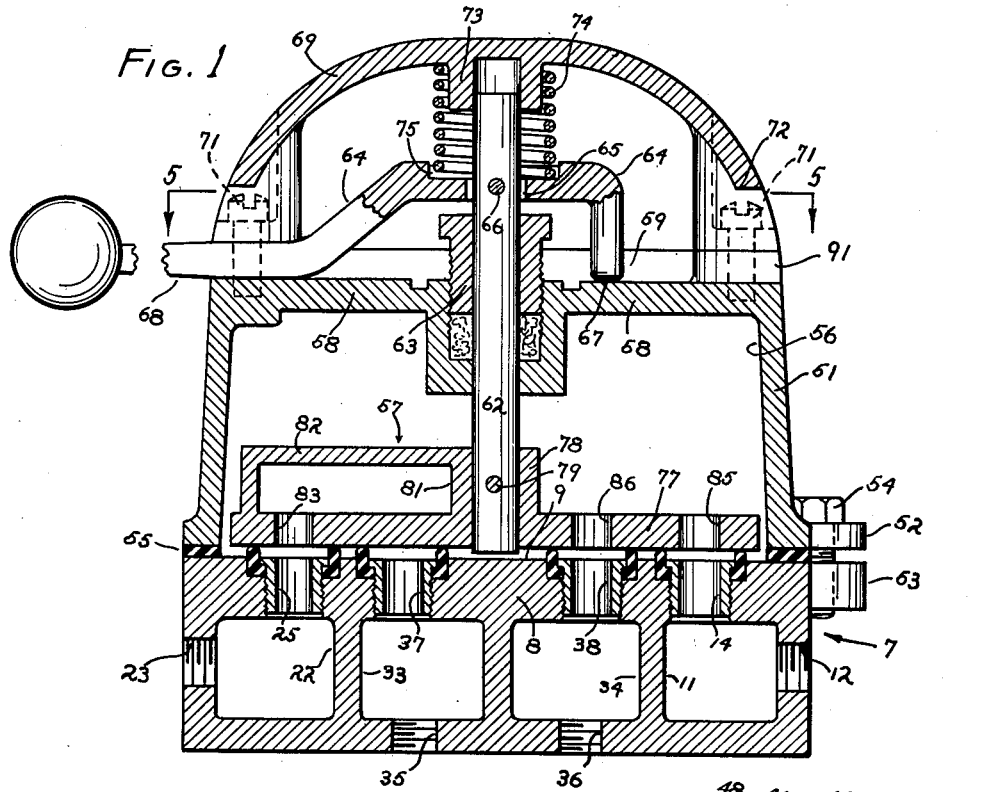
Figure 1 is a section through a valve embodying the invention.

The back plate, designated generally by the numeral 7 in Figure 1, in this instance comprises a cored casting having a face plate 8 provided with an upper face 9, the face plate having a plurality of ports therethrough as will be seen from Figs. 1 and 4. The back of the face plate 8 is provided with a plurality of cored chambers communicating with the ports and with internally threaded holes adapted for connection with threaded pipes for the supply and delivery of liquid.

The valve is constructed particularly for use in connection with water treatment devices and is adapted for connection to a tank A (Fig. 4) or other container for zeolite or analogous base exchange material, such as the so-called ion exchange materials used for the removal of either the cation or anion from liquid passing therethrough. For this purpose the back plate has a chamber 11 and pipe connection 12 adapted for connection to one end of the tank A, in this instance to the top thereof, the chamber 11 having ports 13 and 14 extending through the face plate 8. The back plate has a chamber 15 and pipe connection 16 arranged for connection to a drain line indicated diagrammatically at 10, a port 17 extending through the face plate. A chamber 18 and pipe connection 19 in the base plate is also arranged for connection to the drain 10, and a port 21 in the face plate communicates with the chamber 18. A chamber 22 and pipe connection 23 is arranged for connection to the other end of the tank A, in this instance to the bottom, and is provided with ports 24 and 25 extending through the face plate. A chamber 26 and pipe connection 27 is arranged for connection to service or for the delivery of liquid from the tank A out through the valve to a point of use or further treatment indicated by the numeral 20. A port 28 communicates with the chamber 26 and extends through the face plate 8. The base plate also has a chamber 29 and pipe connection 31 designed for connection to an injector indicated at B to supply liquid under pressure thereto for delivery to the top of the tank A for the purpose of withdrawing reagent from a reagent tank C and delivering the same into the tank A for reconditioning purposes as is well known in the art. The chamber 29 has a port 32 extending therefrom through the face plate. The ports 13, 14, 17, 24, 21, 25, 28 and 32 are of the same diameter, are equally spaced about a common center substantially at 45° angles, and are spaced at equal distances from this center with their centers on the periphery of a circle.

The back plate 7 also has two central or supply chambers 33 and 34 (Fig. 1), each having a threaded supply opening as shown at 35 and 36. The supply opening 35 is normally connected to one source of liquid such as a source of raw water supply in the example herein given, while the supply opening 36 is connected to a source of treated water such as a pre-treatment tank D which may be a filter, an ion exchanger or the like through which liquid passes from a supply F. These chambers are also provided with ports 37 and 38 through the face plate 8, in this instance so arranged that their centers fall on a straight line connecting the centers of the top port 14 and bottom port 25.

Figure 3:
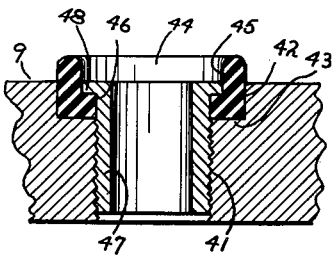
Fig. 3 is a partial section through the back plate showing the structure of the gaskets and gasket retaining means.

Referring now more particularly to Fig. 3, each of the ports consists of a threaded bore 41 and a smooth counterbore 42 in the face 9 providing an annular shoulder 43 at the junction between the bore and counterbore, this shoulder being disposed at right angles to the walls of the bores. Positioned in the counterbore 42 is a ring-like gasket 44 of resilient material such as rubber, preferably in the form of molded rubber rings having an external diameter substantially the same as the diameter of the counterbore and having an internal diameter somewhat greater than the diameter of the bore through the upper portion of its length as shown at 45 and having an internal diameter adjacent the lower portion of its length as shown at 46 substantially equal to the diameter of the bore so as to provide an intermediate shoulder. Threaded into the bore is a sleeve 47 having an annular flange 48 at its upper end adapted to seat against the internal annular flange on the gasket and compress the gasket against the annular shoulder 43 as the sleeve is screwed down into the threaded bore. The sleeve thus effectively forms the port and the internal diameter of the sleeve determines the port size as will be apparent from Figure 1. Since the gaskets are of the same size and the counterbores are all of the same depth, the upper edges of the gaskets will fall substantially in a single plane and the ports may all be closed by a plate adapted to seat against the ends of the gaskets as shown in Figure 1.

Attached to the face of the back plate adjacent its periphery is a bonnet designated generally by the numeral 51, the bonnet having annularly spaced ears 52 coinciding with similar ears 53 spaced annularly of the back plate adapted for the reception of cap screw 54 for holding the bonnet thereto. A ring-type gasket 55 is interposed between the bonnet and the face of the back plate to seal the interface between these members. The bonnet provides an interior chamber 56 above the ported portion of the face 9 for the reception of a rotor 57 presently to be more fully described. In this instance the bonnet has an outer end 58 arranged more or less in parallelism with the face 9 and having an annular upstanding rim 59 provided with spaced slots as shown at 61 (Fig. 5) for the purpose of locating the handle in the various operating positions of the valve. The rotor 57 is carried on a stem 62 passing through a stuffing box 63 in the end 58 of the bonnet, and a lever 64 is pivotally attached to the stem beyond the stuffing box. For this purpose the lever has an opening 65 through which the stem passes, the lever being attached to the stem by means of a pin 66 extending through the lever and the stem. One end of the lever extends downwardly into contact with the end 58 of the bonnet as shown at 67, while the other end of the lever projects outwardly as shown at 68 for manual operation of the valve.

Attached to the annular rim 59 of the bonnet is a cap 69 secured thereto by cap screws 71, the cap extending over the lever 64 to conceal the major portion thereof and substantially cover the end 58 of the bonnet, and edge 72 of the cap being disposed in spaced relation to the annular rim 59 through a portion of the distance around the bonnet, in this instance approximately 180° to provide space for the movement of the lever in indexing the rotor. The inner surface of the cap 69 is provided with a boss 73 serving as a guide for the upper end of the stem 62, and surrounding the boss is a coil spring 74 which acts between the cap and the lever 64 to normally urge the stem 62 downward to seat the rotor. Conveniently the lever may be provided with a locating socket 75 to maintain the spring in located position.

Figure 2:
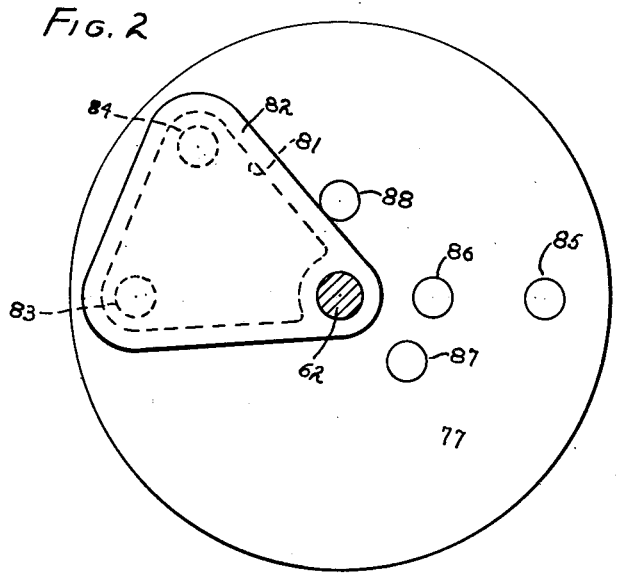
Fig. 2 is a top view of the rotor in the position of Figure 1.

The rotor 57 comprises a disk 77 having a relatively smooth coplanar bottom face adapted for engagement with the gaskets and an upstanding boss 78 for reception of the lower end of the stem 62 which is suitably fastened thereto as by a pin 79. Disposed against the upper surface of the rotor is a transfer passage 81 formed by an enclosing wall 82 on the upper side of the disk. Extending through the disk and communicating with the passage 81 are ports 83 and 84, the port 84 being disposed at 45° from the port 83 in a clockwise direction. Disposed at 180° with respect to the port 83 is a port 85 passing through the disk and communicating at its upper end with the chamber 56 in the bonnet 51. The ports 83, 84 and 85 are disposed at the same distance from the center of the disk as the ports 14, 17, 24, etc. of the back plate and cooperate therewith in controlling the flow of liquid through the valve. A port 86 extends through the disk, its center being disposed on a line joining the centers of the ports 83 and 85, the port 86 being disposed from the center a distance equivalent to that of the ports 37 and 38 of the back plate for cooperation therewith as shown in Figure 1. Disposed 45° in a clockwise direction facing Fig. 2 from the port 86 is a port 87 positioned on the same radius as the port 86. Positioned on the same radius and 90° in a counterclockwise direction facing Fig. 2 is a port 88 passing through the disk. The ports 86, 87 and 88 communicate with the chamber 56 and serve to control the flow of supply fluid to the chamber 56.

In the service position of the valve the handle 64 occupies the position shown in Fig. 5 and is disposed in a slot 89 with the spring 74 urging the rotor into seated position against the gaskets. The rotor occupies the position shown in Figure 1. Treated fluid from the pretreatment tank D enters the valve through the pipe connection 36, passes through the chamber 34, the port 38 of the back plate, and the port 86 of the rotor into the chamber 56. From the chamber 56 it passes out through the rotor port 85, the stator port 14, the chamber 11 and the pipe connection 12 to the top of the treatment tank A. From the bottom of the treatment tank A liquid flows to the pipe connecion 23 into the chamber 22, thence through the back plate port 25 and rotor port 83 into transfer passage 81, thereafter passing from the transfer passage 81 out through the rotor port 84, back plate port 28, chamber 26 and pipe connection 27 to service as indicated at 20.

When the treatment tank A is to be reconditioned the end 68 of the lever 64 is raised to a point at which it contacts or nearly contacts the edge 72 of the cap, the lever tilting around the end of the depending portion 67 of the lever. This compresses the spring 74 and raises the rotor free or substantially free of the gaskets. The lever is then turned to rotate the stem 62 about its longitudinal axis until the lever is disposed over a slot 91, at which point the lever is lowered allowing the spring 74 to reseat the rotor. This turns the rotor through 180° to bring the parts of the valve in a position to backwash the treatment tank A. In this position of the parts untreated fluid from the chamber 33 passes through the back plate port 37 and the rotor port 86 to the chamber 56 and thence through the rotor port 85, the back plate port 25, chamber 22 and pipe connection 23 to the bottom of treatment tank A. From the top of the treatment tank the liquid flows in through the pipe connection 12 and chamber 11 through the back plate port 14, the rotor port 83, the transfer passage 81, and the rotor port 84 to the back plate port 17 and chamber 15 from which the fluid flows to the drain 10.

When the backwashing operation is completed the handle 64 is again raised and rotated through 90° to a position over the slot 92 where the rotor is again seated. In this position of the parts untreated liquid passes from the chamber 33 through port 37 of the back plate and port 88 of the rotor into the chamber 56 and thence through rotor port 85, back plate port 32 and chamber 29 to the injector B and thence to the top of treatment tank A. From the bottom of treatment tank A fluid passes to the chamber 22 and thence through back plate port 24, rotor port 83, transfer passage 81, rotor port 84, back plate port 21, and chamber 18 to the drain 10.

When the regeneration operation is completed the lever is again raised and indexed through 45° back toward the position of Fig. 5 and lowered into a slot 93. In this position of the rotor treated liquid from the pretreatment tank D passes by way of chamber 34 and back plate port 38 through the rotor port 87 into the chamber 56 from which it passes out through rotor port 85, back plate port 13 and chamber 11 to the top of the treatment tank A for the purpose of rinsing any excess reagent and the products of the regeneration out of the tank A. From the bottom of the tank A the liquid passes to the chamber 22, thence through the back plate port 25, the rotor port 84, the transfer passage 81, the rotor port 83, the back plate port 21 and the chamber 18 to the drain 10. Upon completion of the rinsing operation the handle 64 is returned to the position shown in Figs. 1 and 5, completing the cycle of operation of the valve.

A feature of the valve is the structure by which fluid from two different sources is distributed by means of the valve so that in some positions liquid is supplied from one source and in other positions liquid is supplied from a different source. This is of particular merit in a system such as that described because it permits the backwashing and regeneration steps of the reconditioning cycle to be conducted by untreated water, since this water at all events flows to the drain and is never conducted into the service system. The rinsing operation is then conducted by means of treated water so that any impurities introduced by the use of untreated liquid are eliminated during the rinse step.

It will be seen that the ports of the valve are arranged on two different radii, the supply ports being arranged on an inner circle of relatively small radius and the distribution ports being disposed on a larger circle concentric therewith.

Another important feature of the valve is the structure by which the spring 74 is disposed in an accessible position outside the chamber 56. This removes the spring from the corrosive action of the fluid passing through the valve, which is particularly important in installations in which highly corrosive material such as acids are employed for regeneration. The construction is also such that the spring may be replaced or changed without interfering with the operation of the valve and while the valve occupies the service position. It will be seen that while liquid is flowing through the valve the cap screw 71 may be removed permitting removal of the cap 69 and exchange of the spring 74 because the fluid pressure within the chamber 56 holds the rotor in seated position.

Another advantage of the construction is the relationship between the handle and the stem which prevents the operator from utilizing the handle to force the rotor down. It will be seen that the rotor is seated entirely under the action of the spring 74 which gives a uniform and controlled seating pressure, and this pressure cannot be increased by operation of the handle so as to force the rotor down and possibly damage the gaskets.

Another feature of the construction is the fact that the boss 73 provides a guide for the upper end of the stem 62 so that the stem is at all times accurately aligned by the bearing in the stuffing box 63 and by the guide provided in the boss 73.

I claim:

1. The combination in a multiple port valve of a ported back plate, a rotor disposed thereon having a plurality of ports positioned to establish different communication with the ports of the back plate in different angular seated positions of the rotor to control a plurality of separate flows through the valve, gasket means between the back plate and the rotor, a bonnet disposed on the back plate enclosing the ports thereof and the rotor, a stem on the rotor extending through the bonnet and adapted for rotation of the rotor, a cap attached to the bonnet extending over the outer end of the stem and having a guide for the reception of the end of the stem to support and guide the stem against lateral displacement, a coiled compression spring around the stem outside the bonnet acting against the cap and connected to force the stem in a direction to urge the rotor into seated position against the gasket means, and a handle disposed between the bonnet and the cap rotatable on an axis transverse to the stem to raise the stem and rotor against the action of the spring and rotatable with the stem to change the angular position of the rotor.

2. The combination recited in claim 1 wherein the cap is removably attached to the bonnet for removal thereof to replace or repair the spring or handle while the valve is in service.

3. The combination in a multiple port valve of a ported back plate, a rotor disposed thereon having a plurality of ports positioned to establish different communication with the ports of the back plate in different angular seated positions of the rotor to control a plurality of separate flows through the valve, gasket means between the back plate and the rotor, a bonnet disposed on the back plate enclosing the ports thereof and the rotor, a stem on the rotor extending through the bonnet and adapted for rotation of the rotor, the bonnet having a bore and stuffing box for the snug passage of the stem acting to provide a guide to maintain the stem and rotor in alignment, a cap attached to the bonnet extending over the outer end of the stem and having a guide for the reception of the stem to provide a second guide for the stem in spaced relation to said bore, a coiled compression spring between the cap and the bonnet acting against the cap and connected to the stem to force the latter in a direction to seat the rotor against the gasket means, and a handle secured to the stem between said bore and said guide for raising and rotating the stem and the rotor.

4. The combination in a multiple port valve of a ported back plate, a rotor disposed thereon having a plurality of ports positioned to establish different communication with the ports of the back plate in different angular seated positions of the rotor to control a plurality of separate flows through the valve, a bonnet disposed on the back plate enclosing the ports thereof and the rotor, a stem on the rotor extending through the bonnet and adapted for rotation of the rotor, a cap attached to the bonnet enclosing the portion of the stem outside the bonnet and forming a continuation of the outer surface of the bonnet, the cap and bonnet being interconnected and shaped to provide an annular slot along a portion of the interface therebetween in a plane normal to the axis of the stem and intermediate its ends, a handle pivotally connected to the stem in the space between the bonnet and the cap projecting radially through said slot for raising the stem and for rotating the same to raise and turn the rotor, and a coiled compression spring concentric with the stem disposed within the cap and acting between the cap and the handle to force the stem in a direction to urge the rotor toward the back plate.

ROBERT A. WHITLOCK, Jr.

REFERENCES CITED

The following references are of record in the file of this patent:

UNITED STATES PATENTS

| Number | Name | Date |
|---|---|---|
| 1,751,591 | McCloskey | Mar. 25, 1930 |
| 2,209,993 | McGill | Aug. 6, 1940 |
| 2,299,802 | Daniels | Oct. 27, 1942 |
| 2,311,989 | McGill | Feb. 23, 1943 |
| 2,364,697 | Daniels | Dec. 12, 1944 |

FOREIGN PATENTS

| Number | Country | Date |
|---|---|---|
| 638,371 | Germany | of 1935 |